April 9, 1940.  F. W. ARMSTRONG  2,196,582
GASKET, GASKET CENTERING MEANS, AND ASSEMBLY THEREOF
Filed Jan. 4, 1939
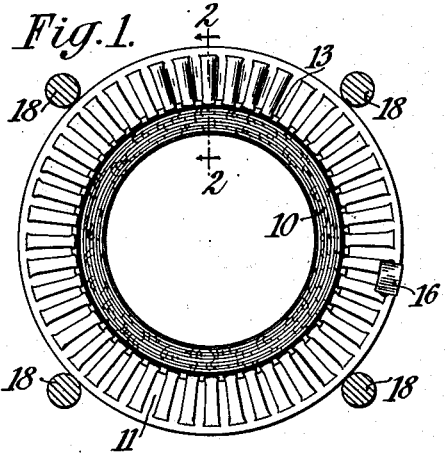
Fig.1.
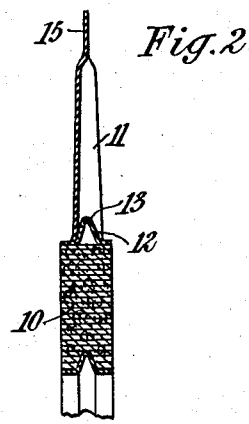
Fig.2.
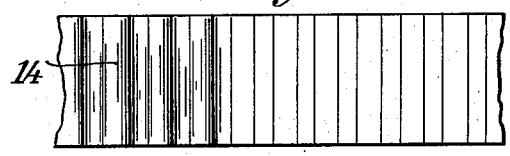
Fig.3.
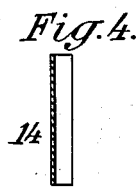
Fig.4.
Fig.5.
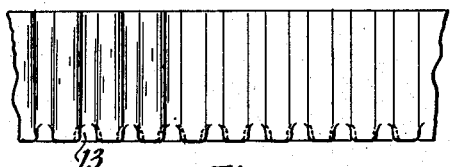
Fig.6.
Fig.7.
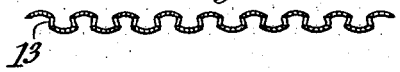
Fig.8.
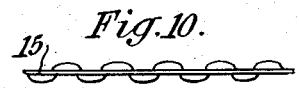
Fig.10.
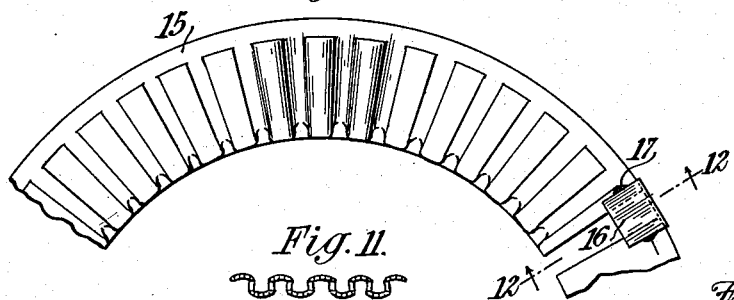
Fig.9.
Fig.12.
Fig.11.
INVENTOR
*Francis W. Armstrong*
BY
*Fraser, Myers & Manley*
ATTORNEYS.

Patented Apr. 9, 1940

2,196,582

UNITED STATES PATENT OFFICE 2,196,582

GASKET, GASKET-CENTERING MEANS, AND ASSEMBLY THEREOF

Francis W. Armstrong, Palmyra, N. Y., assignor to The Garlock Packing Company, Palmyra, N. Y., a corporation of New York Application January 4, 1939, Serial No. 249,196

10 Claims. (Cl. 288—27)

This invention relates to improved means for centering a gasket with respect to parts of the pipe ends or other machine elements between which it is used to seal an intervening joint. The invention may be embodied in a combined gasket and gasket-centering element, or in a gasket assembly comprising a gasket and a centering element adapted to be detachably attached thereto, or to a centering element adapted to be applied to a gasket.

It is an object of the invention to provide a relatively simple and inexpensive centering device which may be readily attached to a sealing element of packing material and properly position the sealing element with respect to a pipe flange or to the bolts of a pipe coupling or other parts of the mechanical structure with which the gasket is to be used and which parts bear a definite relation to the openings into the connected elements at the joint to be sealed. By making use of such a centering device the relatively expensive sealing element of packing material may be limited in size to only what is needed to seal the joint, and the space between such sealing element and the parts of the coupling with which the gasket is used, which are relied upon to properly position the gasket, may be filled out with the relatively inexpensive material of the centering device.

In the form of the invention herein disclosed for purposes of illustration—

Figure 1 is a plan view of a combined sealing ring and centering ring embodying the invention as positioned by four bolts of a coupling, the bolts being represented in cross section.

Fig. 2 is a cross-sectional view through the sealing ring and centering ring, the section being taken along the plane represented by the line 2—2 of Fig. 1.

Fig. 3 is a plan view of a corrugated strip of thin sheet metal from which the centering ring of the device illustrated by Fig. 1 may be made.

Fig. 4 is an end view of the strip of material illustrated by Fig. 3, and Fig. 5 is an edge view thereof.

Fig. 6 is a plan view of the corrugated strip illustrated by Figs. 3, 4 and 5, of which the corrugations have been notched along one edge.

Fig. 7 is an end view of the strip illustrated by Fig. 6, and Fig. 8 is a view of its notched edge.

Fig. 9 is a plan view of a portion of a curved strip of centering material such as may be made from the strip illustrated by Figs. 6, 7 and 8 by flattening the marginal portion opposite its notched edge.

Fig. 10 is a view of a portion of the flattened edge of the strip of material illustrated by Fig. 9, and Fig. 11 is a view of a portion of its notched edge.

Fig. 12 is an end view of the curved strip of material illustrated by Fig. 9, including a cross-sectional view of means for coupling the end of the curved strip to an opposing strip end.

As illustrated by Figs. 1 and 2, a gasket embodying the invention herein to be disclosed may comprise a sealing element 10 of packing material and a surrounding centering element 11 of thin sheet metal.

The sealing ring may be of any appropriate material and construction adapted to seal the joint between a pair of pipe ends or between any corresponding machine elements. It might, for example, consist of ribbons of metal and asbestos fabric or other fibrous material bound into a spiral and having extensions of the metal ribbon secured to adjacent parts thereof to maintain it in a firmly wound relation. Examples of sealing rings of the above-described character may be found in the patents to Hubbard et al., Nos. 1,942,703 and 1,942,704. The outer margins of such sealing rings may be of irregular form, as compared with smooth cylindrical surfaces, so as to be well adapted to cooperate with the inner marginal surfaces of a centering ring of approximately complemental form and thereby permit the centering ring to be snapped into and out of an engaging relation with the sealing ring. In the sealing ring disclosed in Patent No. 1,942,703 (see Figs. 2 and 3) the outer periphery is of wave-like form in cross section and comprises a central, concave annulus nested between a pair of convex annuli. In Figs. 3 and 10 of Patent No. 1,942,704 is disclosed a sealing ring having a concave outer margin, and in Fig. 9 of the same patent is illustrated a sealing ring having a convex outer margin.

The sealing ring illustrated by Figs. 1 and 2 hereof has a convex annulus 12 about its outer margin, which is adapted to cooperate with recesses 13 along the inner margin of a centering ring hereinafter to be described. The characteristic form and construction of the centering ring may best be disclosed by explaining one very practical way in which it may be made. For example, a ribbon of thin sheet metal may first be corrugated to form a strip or blank 14 of indefinite length, having parallel margins as indicated by Figs. 3, 4 and 5. The longitudinal cross-sectional form of the corrugated blank is illustrated by Fig. 5. Portions of this corrugated strip along one edge and midway between its alternate corrugations may then be recessed so as to provide a series of inwardly directed saddles 13, as indicated in Figs. 6, 7 and 8. The recessed corrugated strip may then be flattened, as at 15, along the marginal portion opposite its recessed edge so as to cause it to be curved as indicated in Fig. 9 and form a spiral of stock material from which gasket-centering rings may be cut as required. The curvature of the stock of spiraled material will be dependent upon the width of the corrugated strip, the depth of the corrugations, and the width of the flattened marginal portion. The flattening of the margin of the corrugated material increases its longitudinal dimensions, decreases the lateral dimensions of the corrugations adjacent the flattened portion, increases the lateral dimensions of the corrugations at the recessed edge of the strip, and causes the longitudinal dimensions of the recessed edge of the strip to be decreased.

By suitably apportioning the width of the corrugated strip and the width of the flattened marginal portion it may be caused to have a degree of curvature such that a centering ring of the material cut from the spiraled stock may be snapped into an engaging relation with the convex annulus 12 along the outer margin of a sealing ring of any desired diameter. To this end the sheet metal used in making the spiraled stock should be sufficiently resilient and tractable to permit the centering ring to be slightly dished and pressed over the outer margin of the sealing ring until the saddles along the inner margin of the centering ring may snap into their engaging relations with the convex annulus along the margin of the sealing ring.

If desired, the centering ring, after it has been cut from the spiraled stock material, may be converted into an endless structure by uniting its ends in any appropriate manner. A suitable form of coupling 16, as illustrated by Figs. 1, 9 and 12, might consist of a piece of thin sheet metal folded over the outer end portions of the split ring and securely fastened thereto by soldering, welding, or in any other appropriate manner, as at 17.

The form of centering ring consisting of a discontinuous annulus having its opposed end portions united, but leaving its inner opposed end portions free, is perhaps in some respect superior to a centering ring which might be formed by stamping an endless ring of material to appropriate form, since the split-ring construction having only the outer portions of its opposed ends united could be more readily flexed or distorted to permit the recessed portions of the inner margin of the centering ring to be detachably attached to the convex annulus along the margin of the sealing ring.

It is, of course, not essential that the outer margin of the sealing ring be convex and that the inner margin of the centering ring be recessed. All that is of importance is that the opposed surface portions of the two rings be sufficiently irregular in cross-sectional form as compared with smooth cylindrical surfaces, and sufficiently complementary one with respect to the other, to adapt them to be yieldably forced into an engaging relation and offer a degree of resistance to separation such as to avoid accidental detachment. Either surface might be concave and the other convex, or either might be of a wave-like form complemental to a wave-like form of the other; or with a sealing ring of sufficient thickness surrounded by a centering ring having corrugations of sufficient depth, mere frictional contact might for certain purposes be satisfactory.

As will be apparent from the foregoing description, gaskets constructed in accordance with this invention will result in a relatively large saving in material, workmanship and amount of invested capital. The sealing elements may be made up in the requisite number of standard sizes conforming with the sizes of the openings in the parts to be packed, irrespective of the relative arrangement of their coupling bolts, flanges, or other fastening elements. For example, in Fig. 1 the sealing element 10 is indicated as having been provided with a centering element 11 of radial dimensions such as to adapt it to cooperate with coupling bolts 18, shown in cross section, in properly centering the sealing ring. Should it be desired to use the same sealing ring in a coupling having bolts spaced at greater or lesser distances from the axis of the coupling, or in a coupling having an outer flange the internal diameter of which might be either greater or less than the distance between the opposing bolts indicated in Fig. 1, all that would be necessary would be to detach the centering ring 11 from the sealing ring 10 and substitute therefore another centering ring of appropriate radial dimensions.

The sealing devices and centering devices may, if desired, be kept in stock separately and quickly assembled either when sold or delivered, or when needed for use. Whenever a stock size of sealing elements is to be applied to apparatus having some special form or arrangement of fastening elements, an appropriate centering element may be readily selected from the stock on hand to conform with the dimensions of parts of the coupling with which it is to be used, which will be relied upon to center the sealing element.

One of the largest economies resulting from the use of gaskets embodying the invention is due to the localizing of the relatively expensive packing material to the zone where it is needed to seal a joint and the addition of an element of relatively inexpensive material to serve as a templet or centering device adapted to properly position the packing material.

The invention is not intended to be limited to the specific form herein disclosed for purposes of illustration, but should be regarded as comprising modifications and variations thereof within the scope of the appended claims.

What is claimed is:

1. A gasket comprising a joint-sealing ring of packing material and a surrounding centering ring assembled therewith and consisting of an annulus of thin sheet metal having a flat peripheral portion and a radially corrugated portion extending inwardly therefrom to its inner margin.

2. A gasket, as defined by claim 1, of which the dimensions of the two rings are such that their opposed, marginal portions may be held in a snug but readily separable engagement, the mutually contacting portions of said rings having substantially complementary parts of concave and convex form, respectively, in cross section, adapted to be snapped into and out of an engaging relation and thus yieldingly oppose the attachment and detachment of the component parts of the gasket.

3. A gasket, as defined by claim 1, of which the sealing ring has an outwardly directed, convex annulus extending about its periphery, and of which the parts of the centering ring along the inner margin, and midway between its alternate corrugations, are recessed so as to provide a circular series of inwardly directed saddles, the dimensions of the opposed parts of said ring being such that the saddles may be snapped into a detachable, engaging relation with the convex annulus along the outer margin of the sealing ring.

4. A gasket assembly comprising a joint-sealing ring of packing material and a readily attachable and detachable centering ring, the centering ring consisting of a discontinuous annulus of thin sheet metal having a flat, outer, marginal portion, a radially corrugated portion extending inwardly therefrom to its inner margin and coupling means for uniting the opposed ends of its outer marginal portion, leaving the opposed ends of its inner marginal portion free, the dimensions of the two rings being such that they may be assembled with the inner margin of the centering ring in snug contact with the outer margin of the sealing ring, and the respective marginal surfaces of said rings, thus designed to be brought into mutual contact, having a sufficient degree of complementary irregularity in cross-sectional form to yieldingly oppose a material degree of resistance to the attachment and detachment of the component elements of the assembly.

5. A gasket assembly, as defined by claim 4, of which the annular marginal portions of the sealing and centering rings, which are designed to be brought into mutual contact when the rings are assembled, have substantially complementary parts of concave and convex form, respectively, in cross section, adapted to be readily snapped into and out of an engaging relation.

6. A gasket-centering ring comprising an annulus of thin sheet metal having a flat peripheral portion and a radially corrugated portion extending inwardly therefrom to its inner margin.

7. A gasket-centering ring, as defined by claim 6, in the form of a discontinuous annulus, having coupling means for uniting the opposed ends of its outer marginal portion, leaving the opposed ends of its inner marginal portion free.

8. A gasket-centering ring, as defined by claim 6, in the form of a discontinuous annulus, having coupling means comprising a piece of thin sheet metal folded over the outer portions of the opposed ends of the annulus and securely fastened thereto.

9. A gasket-centering ring, as defined by claim 6, of which the inner marginal surface is irregular in its cross-sectional form, so as to be adapted to be readily forced into a detachable engaging relation with a gasket having an outer marginal surface of complemental, irregular, cross-sectional form, and of dimensions such as to oppose working resistance to the engagement and disengagement of said parts.

10. A gasket-centering ring, as defined by claim 6, of which the parts of its inner margin midway between its alternate corrugations are recessed so as to provide a circular series of inwardly directed saddles.

FRANCIS W. ARMSTRONG.